United States Patent [19]

Lundberg et al.

[11] 4,147,677

[45] Apr. 3, 1979

[54] DRY BLENDING OF NEUTRALIZED SULFONATED ELASTOMERIC POWDERS

[75] Inventors: Robert D. Lundberg, Bridgewater; Henry S. Makowski, Scotch Plains, both of N.J.; Jan Bock, Houston, Tex.

[73] Assignee: Exxon Research & Engineering Co., Florham Park, N.J.

[21] Appl. No.: 855,764

[22] Filed: Nov. 29, 1977

[51] Int. Cl.$^2$ .............................................. C08L 91/00
[52] U.S. Cl. ........................ 260/23.5 A; 260/28.5 B; 260/33.6 AQ; 260/42.33; 260/42.47; 260/DIG. 31; 526/41
[58] Field of Search ............ 260/23.7, 23.5 A, 79.3 R, 260/33.6, 28.5 B, 889, 878 R, 879, 42.33, 42.47

[56] References Cited

U.S. PATENT DOCUMENTS

| | | | |
|---|---|---|---|
| 3,432,480 | 3/1969 | Stratton | 260/79.3 R |
| 3,642,728 | 2/1972 | Canter | 260/79.3 R |
| 3,847,854 | 11/1974 | Canter et al. | 260/23.7 M |
| 3,925,280 | 12/1975 | Lundberg et al. | 260/23 R |

*Primary Examiner*—Lewis T. Jacobs
*Attorney, Agent, or Firm*—Richard E. Nanfeldt

[57] ABSTRACT

This invention relates to a process for first preparing a free flowing finely divided powder of a neutralized sulfonated elastomer and subsequently and optionally admixing said formed powder with other agents such as fillers and oils thereby providing free flowing powders capable of being subsequently fabricated into tough elastomeric objects. The neutralized sulfonated elastomeric polymer can be converted into a free flowing finely divided powder which does not agglomerate or cold flow under ambient conditions by a variety of processes, preferably by a grinding process conducted at low temperatures. The formed powder of the neutralized sulfonated elastomeric polymer is blended with at least one chemical additive into a homogeneous mixture, wherein the chemical additive is selected from the group including fillers, polyolefinic thermoplastics, non-polar backbone process oils, lubricants or a metallic oxide and mixtures thereof. The homogeneous mixture is formed into a finished elastomeric article by conventional fabrication.

33 Claims, No Drawings

DRY BLENDING OF NEUTRALIZED SULFONATED ELASTOMERIC POWDERS

BACKGROUND OF THE INVENTION

1. Field of the Invention

This invention describes a process for preparing a free flowing finely divided powder of a neutralized sulfonated elastomer and teaches how admixing said powder with other agents such as fillers and oils can lead to free flowing powders capable of being subsequently fabricated into tough elastomeric objects. The neutralized sulfonated elastomeric polymer is converted into a free flowing finely divided powder which does not agglomerate or cold flow under ambient conditions by a variety of processes, preferably by a grinding process conducted at low temperatures. The powder of the neutralized sulfonated elastomeric polymer is blended with at least one chemical additive into a homogeneous mixture, wherein the chemical additive is selected from the group including fillers, polyolefinic thermoplastics, non-polar backbone process oils, lubricants or a metallic oxide and mixtures thereof. The homogeneous mixture is formed into a finished elastomeric article by conventional fabrication.

2. Description of the Prior Art

Historically, in the compounding of extended elastomeric polymer, the elastomeric polymer in a crumb form is mixed with process oils and fillers in an intensive mixing device such as a Banbury. This process requires substantial energy due to the high shear required to mix these viscous polymers. This process has many inherent disadvantages, among which are: the high capital cost of these intensive mixers; the substantial energy input required to mix these materials; the limitations of the types of materials which can be mixed in terms of viscosity; the possibility of scorching or shear degrading the various polymers and chemical additives; and the long mixing times and cycles required for such operations.

Recently, a new class of elastomeric polymers have been developed which are neutralized sulfonated elastomeric polymers. Heretofore, these neutralized sulfonated elastomeric polymers have been compounded in a crumb or diced form with oil and fillers in an intensive mixing device or on a two roll mill.

Ideally, one would like to avoid these previously described mixing operations thereby effecting a substantial economic saving. The process of the present invention describes a process whereby a free flowing finely divided powder of a neutralized sulfonated elastomeric polymer is dry blended with a chemical additive in a suitable mixing device and subsequently formed into a finished elastomeric article by conventional forming processes.

The conventional elastomeric polymers such as ethylene propylene rubbers of useful molecular weight can be formed into a free flowing, finely divided powder, but within a short time at ambient temperature the powder agglomerates into a useless mass because the uncured elastomeric polymer exhibits a tendency to cold flow thereby causing the powder to fuse together into a coalesced mass. This problem can be partially circumvented by going to extremely high molecular weight polymers, but this is not an acceptable approach because such materials still manifest some cold flow, and also they are not useful in many applications because they are too high in molecular weight to be useful. The neutralized sulfonated elastomeric polymers of the present invention do not exhibit this tendency of the polymer to agglomerate into a coalesced mass and will remain as free flowing powders, either alone or when blended with fillers and oils or other chemical additives.

U.S. Pat. No. 3,642,728, herein incorporated by reference, teaches a method of selective sulfonation of olefinic unsaturation sites of an elastomeric polymer to form an acid form of a sulfonated elastomeric polymer. The olefinic sites of the elastomeric polymer are sulfonated by means of a complex of a sulfur trioxide donor and a Lewis base. The SO$_3$H groups of the sulfonated elastomer can be readily neutralized with a basic material to form an ionically crosslinked elastomer in the crumb form at room temperature having substantially improved physical properties over an unsulfonated elastomer. However, these sulfonated elastomers, unlike their unsulfonated counterparts, may be processed like a conventional thermoplastic at elevated temperatures under a shear force in an intensive mixing device in the presence of selected preferential plasticizers which dissipate the ionic associations at the elevated temperatures thereby creating a reprocessable elastomer. The basic materials used as neutralizing agents are selected from organic amines or basic materials selected from Groups I, II, III, IV, V, VIB, VIIB and VIII and mixtures thereof of the Periodic Table of Elements.

U.S. Pat. No. 3,836,511, herein incorporated by reference, teaches an improved process for the sulfonation of the olefinic sites of the elastomeric polymer, wherein the improved sulfonating agent is selected from acetyl sulfate, propionyl sulfate and butyryl sulfate. The neutralizing agents employed to neutralize the acid form of the sulfonated elastomeric polymers are organic amines. The resultant ionically crosslinked sulfonated elastomers prepared by this process are isolated in the crumb form.

U.S. Pat. No. 3,870,841, herein incorporated by reference, teaches a method of plasticization of the polymeric backbone of a neutralized sulfonated plastic polymer in a crumb form by means of a polymer chain plasticizer which is a liquid compound having a boiling point of at least about 120° C. The polymer chain plasticizer is selected from a dialkyl phthalate, a process oil or an organic acid ester. Additionally, a domain plasticizer can be incorporated into the composition, wherein the domain plasticizer reversible disrupts the association of the sulfonate groups at a temperature of forming.

U.S. Pat. No. 3,857,854, herein incorporated by reference, teaches a method of improving the processability of neutralized sulfonated elastomeric polymers in the crumb form by the addition of a preferential plasticizer which has at least one functional constituent which exhibits a bond moment whose absolute value is at least about 0.6 Debye, and must be a liquid at the desired processing temperature of the neutralized sulfonated elastomeric polymer.

U.S. patent applications Nos. 542,502 and 524,514, herein incorporated by reference, of the present inventors, filed on Nov. 18, 1974, describe the compounding of a crystalline polyolefinic material with a crumb form of a neutralized sulfonated elastomeric polymer in an intensive mixing device. These aforementioned patents and applications fail to prove a means for the isolation of a free flowing finely divided powder of a neutralized sulfonated elastomeric polymer which can be readily and subsequently dry blended by conventional mixing processes with fillers, oils, thermoplastics, and lubricants into a free flowing, non-agglomerating mixture and the subsequent formation of a finished elastomeric article by conventional fabrication processes.

SUMMARY OF THE INVENTION

It is well known in the field of elastomers that non-crystalline, uncured elastomers or those of low crystallinity will agglomerate or cold flow at ambient temperatures. This tendency to cold flow has been a major factor influencing the selection of equipment for subdividing these polymers, for compounding them and finally for certain stages of their fabrication. The present invention describes an approach which circumvents the massive problems of expensive energy intensive mixing operations such as a Banbury or extrusion and pelletization in order to convert an elastomer plus fillers, oils and other additives into a useful compound capable of subsequent fabrication.

This invention teaches that a neutralized sulfonated elastomer can be converted into a free flowing, nonagglomerating powder which can be subsequently admixed with fillers, oils, plastics and other additives to create a free flowing powder which does not agglomerate, and which can be subsequently injection molded or extruded into rubber like articles of good physical properties. Prior to this invention this problem was not easily performed, if at all, on the base polymers described in the instant invention.

GENERAL DESCRIPTION OF THE INVENTION

The present invention relates to a unique form of an elastomer which is a free flowing, finely divided powder of a neutralized sulfonated elastomeric polymer which can be readily dry blended with a plurality of chemical additives into a homogeneous mixture that can be formed into a finished elastomeric article by conventional fabrication processes.

The elastomeric polymers of the present invention are derived from ethylene propylene terpolymer (EPDM) having olefinic unsaturation sites, wherein the polymer has from about 0.3 to about 10 mole percent olefinic unsaturation. The unsaturation sites can be in the polymer backbone, pendant therefrom or cyclic.

The term "EPDM" is used in the sense of its definition as found in ASTM-D-1418-64 and is intended to mean a terpolymer containing ethylene and propylene in the backbone and a diene for unsaturation. Illustrative methods for producing those terpolymers are found in U.S. Pat. No. 3,280,082, British Pat. No. 1,030,289 and French Pat. No. 1,386,600, which are incorporated herein by reference. The preferred terpolymers contain about 45 to about 65 wt. % ethylene and about 2 to about 10 wt. % of a diene monomer, the balance of the polymer being propylene. Preferably, the polymer contains about 50 to about 60 wt. % ethylene, e.g. 50 wt. % and about 2.6 to about 9.0 wt. % diene monomer, e.g. 5.0 wt. %. The diene monomer is preferably a nonconjugated diene. The $M_n$ of the terpolymer is preferably about 10,000 to about 200,000; more preferably about 15,000 to about 100,000; and most preferably about 20,000 to about 60,000. The Mooney viscosity (ML, 1 + 8, 212° F.) of the terpolymer is preferably 5 to 60, more preferably 10 to 50 and most preferably 20 to 50; e.g. 40. The $M_v$ of the EPDM is preferably below about 350,000 and more preferably below about 300,000; e.g. 270,000. The $M_w$ of the EPDM is preferably below about 500,000 and more preferably below about 350,000; e.g. 343,000.

Illustrative of these nonconjugated diene monomers which may be used in the EPDM terpolymer are 1,4-hexadiene, dicyclopentadiene, 5-ethylidene-2-norbornene, 5-methylene-2-norbornene, 5-propenyl-2-norbornene and methyl tetrahydroindene. A typical EPDM is Vistalon 2504 (Exxon Chemical Co.) a terpolymer having a Mooney viscosity (ML, 1 + 8, 212° F.) of about 40 and having 50 wt. % of ethylene, 45 wt. % of propylene and 5.0 wt. % of 5-ethylidene-2-norbornene with an $M_n$ of about 27,000, an $M_v$ of about 145,000 and an $M_w$ of about 174,000.

EPDM terpolymers having above 70 wt. % of ethylene are not contemplated by the present invention. These terpolymers having a moderate to high degree of crystallinity can be readily pulverized into a powder form without massive agglomeration at ambient temperatures. However, the resulting crystallinity of these high ethylene content EPDM terpolymers results in changes in physical properties such as tensile strength, hardness, set properties and useful oil extension levels, thereby making them undesirable for a plurality of intended applications. EPDM terpolymers with ethylene contents below 70 wt. % cannot be pulverized without a significant tendency to agglomerate at ambient or moderately elevated temperatures. When this agglomeration occurs, depending on the size of the agglomerated mass, the compounder faces at minimum a major inconvenience to the ultimate possibility of a completely unusable material.

Vistalon 3708 (Exxon Chemical Co.) is a terpolymer having a Mooney viscosity (ML, 1 + 8, 260° F.) of about 45–55 and having about 65 wt. % of ethylene, about 3.3 wt. % of 5-ethylidene-2-norbornene; and about 32.7 wt. % of propylene with an $M_n$ of about 53,000; an $M_w$ of about 343,000; and an $M_v$ of about 270,000.

Vistalon 6505 (Exxon Chemical Co.) is a terpolymer having a Mooney viscosity (ML, 1 + 8, 260° F.) of about 45–55 and having about 53 wt. % of ethylene, about 9.0 wt. % of 5-ethylidene-2-norbornene and about 38 wt. % of propylene.

Nordel 1320 (DuPont) is another EPDM terpolymer having a Mooney viscosity (ML, 1 + 8, 212° F.) of about 15 and having about 53 wt. % of ethylene, about 3.5 wt. % of 1,4-hexadiene, and about 43.5 wt. % of propylene.

In carrying out the present invention, the EPDM is sulfonated with a sulfonating agent selected from the group consisting of acetyl sulfate, preformed or generated in situ from acetic anhydride and concentrated sulfuric acid, an acyl sulfate, or a sulfur trioxide donor complexed with a Lewis base containing oxygen, nitrogen or phosphorus. This technology is described in detail in copending applications authored by Henry S. Makowski et. al. (Ser. No. 855,722) which was filed the same day as this application and is herein incorporated by reference.

It should be pointed out that neither the sulfonating agent nor the manner of sulfonation is critical, provided that the sulfonating method does not degrade the polymer backbone.

In the practice of this invention, the polymer to be sulfonated is dissolved in a suitable solvent and reacted with the sulfonating agent. The solvent medium must be a neutral one for the rubber and the sulfonating agent. The solvent is preferably an aromatic hydrocarbon, an aliphatic hydrocarbon, or a halogenated aromatic hydrocarbon. Illustrations of these solvents are: isopentane, pentane, cyclohexane, isohexane, hexane, heptane and homologues thereof, benzene, toluene, chlorobenzene or xylene. The preferred solvent is an aliphatic hydrocarbon.

Sulfonation of the polymer is conducted at a temperature between $-100°$ and $+100°$ C. and sulfonation occurs when the sulfonating agent is added to the polymer solution. The sulfonating agent is preferably dissolved in a suitable solvent, or may be added directly without solvent. Reaction time may be 5 minutes to 60 minutes, more preferably about 30 minutes, wherein the product remains soluble throughout the reaction period.

The acid form of the sulfonated elastomeric is quenched with a liquid aliphatic alcohol such as methanol, ethanol or isopropanol, an aromatic hydroxyl compound such as phenol, or water.

The amount of desirable sulfonation depends on the particular application. Preferably, the elastomeric polymer is sulfonated at about 10 to about 60 meq. $SO_3H/100$ grams of polymer, more preferably at about 10 to about 50 meq. $SO_3H/100$ grams of polymer, and most preferably at about 20 to about 40 meq. $SO_3H/100$ grams of polymer. The meq. of $SO_3H/100$ grams of polymer was determined by dissolving the acid form of the sulfonated polymer in a mixed solvent of 95 parts of toluene and 5 parts of methanol at a concentration level of 50 grams per liter of solvent. The acid form is titrated with sodium hydroxide in ethanol to an Alizarin Thymolphthalein endpoint. Sulfur analysis was determined by Dietert Analysis.

Polymers containing unsaturation and sulfonic acid groups have been found to be somewhat deficient in thermostability. Therefore, it is desirable to neutralize at least a portion of the sulfonic acid as part of the manufacturing of sulfonated elastomeric polymer. Neutralization further improves the physical properties of the sulfonated polymer.

In preparing the ionomer it is not necessary but desirable to neutralize every sulfonic acid group. Preferably, at least about 50% of the sulfonic acid groups are neutralized, more preferably at least about 90% of the sulfonic acid groups are neutralized; most preferably the sulfonic acid groups are 100% neutralized.

The neutralizing agents of the present invention are metallic salts of carboxylic acids, wherein the metallic ion of the metallic salt is selected from the group consisting of Groups I-A, II-A, I-B or II-B, iron, antimony, or lead of the Periodic Table of Elements and mixtures thereof.

The carboxylate ion of the metallic salt is derived from the following carboxylic acids, however, other carboxylic acids of the same generic class can be readily employed and are considered within the spirit and scope of the present embodiment. These carboxylic acids are: acetic, benzoic, lauric, palmitic, myristic, decanoic, octanoic and stearic.

Other neutralizing agents of this invention are metallic oxides, wherein the metallic ion is selected from the group consisting essentially of Groups II-A, II-B or lead and mixtures thereof of the Periodic Table of Elements. Metallic hydroxides can also be employed wherein the metallic ion is selected from the group consisting essentially of Groups I-A and II-A.

The neutralizing agent is added to the solution of the acid form of the sulfonated elastomeric polymer to form the neutralized sulfonated elastomeric polymer.

To the neutralized sulfonated elastomeric polymer in solution is added a preferential plasticizer selected from the group consisting essentially of a carboxylic acid or metal salts of these carboxylic acids, wherein the metal ion of the metal salt of the carboxylic acid is selected from the Groups I-A, II-A, I-B, II-B, iron, lead or antimony of the Periodic Table of Elements and mixtures thereof. The preferential plasticizer is incorporated into the neutralized sulfonated EPDM terpolymer at about 0 to about 60 parts per hundred, more preferably at about 5 to about 50 and most preferably at about 10 to about 40. Alternatively, other preferential plasticizers are selected from organic esters, alcohols, phosphates, amines, amides or ureas and mixtures thereof. The neutralized sulfonated elastomeric polymer with preferential plasticizer is isolated as a crumb form from the solution by conventional steam stripping or filtration.

The neutralizing agent and preferential plasticizer can be the identical chemical species, when it is a metallic salt of a carboxylic acid. In this case, when plasticization is required, additionally metallic salt is added over the required levels of neutralization.

The dried crumb of the neutralized sulfonated unplasticized elastomeric polymer has a viscosity at $0.73$ $\sec^{-1}$ at 200° C. of about $5 \times 10^4$ to about $1 \times 10^7$ poises, more preferably about $2 \times 10^5$ to about $5 \times 10^6$ and most preferably about $5 \times 10^5$ to about $5 \times 10^6$ poises.

One approach to preparing the powder of a neutralized sulfonated EPDM is that of cryogenic grinding. The dried crumb form of the neutralized sulfonated elastomeric polymer is cooled to a low temperature preferably below its glass transition point by placing the neutralized sulfonated elastomeric polymer in a cryogenic cooling unit or cooling with dry ice. The cooled neutralized sulfonated elastomeric polymer is pulverized into the free flowing, finely divided powder by conventional equipment such as grinder, ball milling, granulator, high speed knife blades and other procedures. This finely divided powder does not agglomerate or block, even when stored in containers for prolonged periods of time at room temperature. The diameter of the particles of the free flowing, finely divided powder are about 0.1 to about 4 mm; more preferably about 0.3 to about 2 mm; and most preferably about 0.5 mm to about 1.5 mm. The volume density of the powder is about 15 lbs/cu ft to about 40 lbs/cu ft.

The powder can be dry blended with a plurality of chemical additives into a free flowing homogeneous mixture. The conventional blending techniques of the present invention are: high speed mixers such as a Henschel; a ribbon blender; a conical blender; a drum tumbler; or even mixing by hand.

The powder of the neutralized sulfonated elastomeric polymer or the blends of the neutralized sulfonated elastomeric polymer can be fabricated into finished elastomeric articles by subjecting them to sufficient heat, at least about 75° C. to about 250° C., to cause the material to fuse into a coherent high strength elastomeric composition. These formulations can be readily extruded, injection molded, rotationally cast, employed as coatings and subjected to the conventional fabrication processes historically limited to polyvinyl chloride technology.

The chemical additives used in the formation of homogeneous mixtures with the powder of the neutralized sulfonated elastomeric polymer are selected from the group consisting essentially of fillers, non-polar backbone process oils, metallic oxides, lubricants, or polyolefinic thermoplastics and mixtures thereof. Both inorganic and organic pigments are considered to be within the scope of the definition of fillers.

These chemical additives are blended with the powder of the neutralized sulfonated elastomeric polymer at a concentration lever of about 10 to about 500 parts by weight per hundred of the sulfonated polymer; more preferably at about 50 to about 300 and most preferably at about 75 to about 200.

The fillers employed in the present invention are selected from carbon black, alumino-silicates, talcs, calcium silicate, ground calcium carbonate, water precipitated calcium carbonate, magnesium silicate, or delaminated, calcined or hydrated clays and mixtures thereof. Examples of carbon black are lamp, channel, furnace or acetylenic blacks.

The fillers are incorporated into the composition at a concentration lever of about 0 to about 400 parts per hundred, more preferably at about 50 to about 200 and most preferably at about 50 to about 150.

Typically, these fillers have a particle size of about 0.03 to about 15 microns, more preferably about 0.5 to about 10, and most preferably about 2 to about 10. The oil absorption of the filler as measured by grams of oil absorbed by 100 grams of filler is about 10 to about 120, more preferably about 10 to about 50, and most preferably about 10 to about 30. Typical fillers employed in this present invention are illustrated in Table I.

particular, the waxes employed in this present invention have a softening point of about 135° F. to about 220° F., more preferably about 135° F. to about 200° F., and most preferably about 150° F. to about 200° F. The preferred waxes have less than 2 wt. % of polar-type compounds and an Mn of about 1000 to about 4,000, more preferably 1500 to 3000. The waxes contemplated for use in this present invention can be selected from the group consisting essentially of synthetic, petroleum, or natural waxes.

The lubricants are incorporated at a concentration level of about 0 to 30 parts per hundred, more preferably at about 1 to about 25, and most preferably at about 5 to about 20. Some of these typical waxes are illustrated in Table II.

TABLE II

| TYPICAL PROPERTIES OF PARAFFIN WAX IN DIFFERENT MELTING POINT RANGES | | | | | |
|---|---|---|---|---|---|
| | $A^a$ | $B^b$ | $C^c$ | $D^d$ | $E^e$ |
| Melting Point, ° C. (ASTM-D-87) | 51–53 | 54–56 | 56–58 | 60–62 | 67–71 |
| Oil Content, % (ASTM-D-721) | 0.1–0.4 | 0.1–0.3 | 0.1–0.2 | 0.1–0.2 | 0.2–0.5 |
| Hardness (Penetration) at 25° C. (77° F.) (ASTM-D-1321) | 14–20 | 12–15 | 10–14 | 9–14 | 9–18 |
| Hardness (Penetration) at 38° C. (100° F.) (ASTM-D-1321) | 80–200 | 50–100 | 40–60 | 20–40 | 13–38 |
| Saybolt Viscosity at 99° C. (210° F., SUS) (ASTM-D-88) | 37–39 | 37–39 | 38–40 | 40–42 | 45–53 |
| Kinematic Viscosity at 99° C. (210° F.), cSt (ASTM-D-445) | 3.2–3.8 | 3.2–3.8 | 3.6–3.9 | 4.1–4.9 | 5.57–8.2 |

[a]Includes Atlantic Wax 151, Essowax 2530, Gulfwax 27, Mobilwax 128/130, Shellwax 100, Sunoco Wax 3425.
[b]Includes Aristowax 130/134, Atlantic Wax 171, Boron Wax 133/135, Essowax 3050, Shellwax 120, Sunoco Wax 3422.
[c]Includes Boron Wax 138/140, Eskar Wax R-35, Essowax 3250, Mobil Wax 138/140, Sinclair Wax 133, Sunoco Wax 3420.
[d]Includes Atlantic Wax 1115, Essowax 4030, Gulfwax 40, Pacemaker Wax 45, Sinclair Wax 141, Shellwax 270.
[e]Includes Aristowax 165, Essowax 5250, Shellwax 300, Sunoco Wax 5512.

Zinc oxide can be incorporated into the blend as a whitening pigment as well as a means for improving the ionic bonding force between the sulfonate groups in the sulfonated terpolymer. The zinc oxide is incorporated into the blend composition at a concentration level of about 0 to about 25 parts per hundred, more preferably about 0 to about 15. Alternatively, a Rutile or Anatase titanium dioxide can be employed as a whitening pigment.

The oils employed in the present invention are nonpolar backbone process oils having less than about 2 wt. % polar type compounds as measured by molecular type clay gel analysis. These oils are selected from paraffinics ASTM Type 104B, as defined in ASTM-D-

TABLE I

| Filler | Code # | Oil Absorption grams of oil/100 grams of filler | Specific Gravity | Avg. Particle Size Micron | pH |
|---|---|---|---|---|---|
| Calcium carbonate ground | Atomite | 15 | 2.71 | | 9.3 |
| Calcium carbonate precipitated | Purecal U | 35 | 2.65 | .03–.04 | 9.3 |
| Delaminated clay | Polyfil DL | 30 | 2.61 | 4.5 | 6.5–7.5 |
| Hydrated clay | Suprex | — | 2.6 | 2 | 4.0 |
| Calcined clay | Icecap K | 50–55 | 2.63 | 1 | 5.0–6.0 |
| Magnesium silicate (talc) | Mistron Vapor | 60-70 | 2.75 | 2 | 9.0–9.5 |
| Calcium silicate | — | 120 | 2.1 | .03 | 10.0 |

The lubricants employed in the present invention are selected from the group consisting essentially of polyolefinics, paraffins, aromatics or naphthenic waxes. In 2226-70, aromatics ASTM Type 102 or naphthenics ASTM Type 104A, wherein the oil has a flash point by the Cleveland open cup of at least 350° F., a pour point of less than 40° F., a viscosity of about 70 to about 3000 ssu's and a number average molecular weight of about 300 to about 1000, more preferably about 400 to about 750. The preferred process oils are paraffinics. Table III illustrates typical oils encompassed by the scope of the invention.

TABLE III

| Type Oil | Oil Code # | Viscosity ssu | $M_n$ | % Polars | % Aromatic | % Saturates |
|---|---|---|---|---|---|---|
| Paraffinic | Sunpar 115 | 155 | 400 | 0.3 | 12.7 | 87.0 |
| Paraffinic | Sunpar 180 | 750 | 570 | 0.7 | 17.0 | 82.3 |
| Paraffinic | Sunpar 2280 | 2907 | 720 | 1.5 | 22.0 | 76.5 |
| Aromatic | Flexon 340 | 120 | — | 1.3 | 70.3 | 28.4 |
| Naphthenic | Flexon 765 | 505 | — | 0.9 | 20.8 | 78.3 |

The oils are incorporated into the composition at a concentration level of about 0 to about 100 parts per hundred, more preferably at about 25 to about 90, and most preferably at about 25 to about 80.

The amount of oil which can be incorporated into these systems is somewhat limited without losing the desirable characteristics of a free flowing dry blended composition. The actual amount of oil which can be tolerated is dependent on a number of characteristics of the entire mix such as the amount, type, and particle size of the filler employed, the particular EPDM employed, the sulfonation content, the plasticizer type and level employed, and the temperature to which the mixture is exposed. If too much oil is added, the resultant composition becomes too soft and will tend to agglomerate. Therefore, it is preferred to employ moderate levels of oil during the dry blending process (less than 90 parts per 100 parts of sulfonated EPDM gum). If more oil is desired, this can be incorporated directly in the gum prior to the granulation process thereby circumventing the aforementioned limitation.

A crystalline polyolefinic thermoplastic can be incorporated into the blend composition in minor proportions as a means for modification of the rheological properties of the blend compositions as well as the hardness and abrasion resistance of the rubberized footwear sole. The crystalline polyolefinic thermoplastic is preferably selected from the group consisting essentially of polyethylene having a melt index of at least about 6, a homopolymer or copolymer of polypropylene having a melt flow of at least about 10, and ethylene-propylene copolymers and mixtures thereof. These polymers are characterized as having a degree of crystallinity of at least 25 percent, preferably at least forty percent. The crystalline polyolefinic thermoplastic of this invention has a number average molecular weight of at least about 5,000 to about 250,000 and more preferably of at least about 10,000 to about 150,000.

The polyolefinic thermoplastic is incorporated into the composition at a concentration level of about 0 to about 90 parts per hundred; more preferably about 5 to about 50; and most preferably about 5 to about 20.

A metallic hydroxide can be incorporated into the blend composition as a means of neutralizing any residual free stearic acid in the neutralized sulfonated terpolymer. The metallic hydroxide is incorporated at a concentration level of about less than 2.0 wt. %, wherein the metal ion of the metallic hydroxide is selected from Group II-A of the Periodic Table of Elements such as barium, calcium or magnesium.

A free flowing, finely divided powder of a neutralized sulfonated elastomeric EPDM was not obtainable by the processes of the aforementioned U.S. Patents and applications previously incorporated herein. The process of the present invention describes a means for the ready formation of a free flowing, finely divided powder of a neutralized sulfonated elastomeric polymer thereby permitting dry blending in conventional equipment of the neutralized sulfonated elastomeric polymer with chemical additives.

DETAILED DESCRIPTION

The advantages of the present process in the formation of a free flowing, finely divided powder of a neutralized sulfonated elastomeric polymer can be more readily appreciated by reference to the following examples. Unless otherwise specified, all measurements are in parts per hundred by weight.

EXAMPLE 1

Vistalon 2504, a commercial EPDM with a Mooney viscosity (ML, 1 + 8, 212° F.) of 40 was depolymerized in a hot extruder to a Mooney viscosity of about 20. To a solution of 500 grams of the 20 Mooney Vistalon 2504 in 5000 ml of hexane at room temperature was added 304 mmoles of acetic anhydride followed by 187.5 mmoles of concentrated sulfuric acid. After 30 minutes, the sulfonation was quenched with 750 ml of isopropanol. Stearic acid (0.45 mole) was added and, after solution was achieved, the sulfonated cement was neutralized with a solution of 0.225 mole of zinc acetate in 125 ml water. Antioxidant 2246 (2.5g) was added and the cement stirred for 30 minutes. The acid form of the sulfonated EPDM terpolymer contained 33 meq. $SO_3H$ groups/100 grams of EPDM. The cement was steam stripped to isolate a polymer crumb which was subsequently dried. The average diameter of the crumbs was about 0.4 to about 0.5 inches. The crumb was then cooled with dry ice to a temperature ranging from 0° C. to −78° C. Alternatively, the crumb was placed in a cyrogenic unit to effect cooling. The cooled crumb was pulverized in a Cumberland grinder having a 20 mesh screen. The resultant free flowing finely divided powder did not agglomerate or block, when packaged and contained under load (estimated at 5 to 10 psi) for 30 days at ambient temperature. The average diameter of the particles of the powder was about 1 mm and had a range of about 0.3 to about 4.0 mm. The volume density of this powder was about 20 lbs/cu ft.

EXAMPLE 2

An EPDM having a Mooney viscosity (ML, 1 + 8, 212° F.) and containing about 50% ethylene, 45% propylene and 5% 5-ethylidene-2-norbornene monomer was cooled below 0° C. and pulverized into a powder. This powder coalesced into a fused mass within ten minutes at ambient temperatures. Dicing this unsulfonated EPDM into ¼" squares resulted in a product which coalesces in two hours. This result clearly contrasts with the behavior of the polymer in Example 1 and is generally characteristic of EPDM polymers of moderate molecular weight and little or no crystallinity.

EXAMPLE 3

The following formula expressed in parts per hundred by weight was prepared from the free flowing, finely divided powder of the neutralized sulfonated EPDM 2504 terpolymer of Example 1.

| | Parts Per Hundred By Weight |
|---|---|
| Sulfonated EPDM 2504 terpolymer (Powder) | 100.0 |
| Purecal U mineral filler | 67.0 |
| Icecap K mineral filler | 48.0 |
| Zinc oxide | 5.0 |
| Magnesium hydroxide | 2.0 |
| Irganox 1010 stabilizer (Ciba Geigy) | 0.5 |
| Process oil Sunpar 2280 | 63.0 |
| Paraffin wax (m.p. 150° F.) | 10.0 |

The fillers, oil and wax were combined and mixed by hand until a uniform yellow powder was obtained. The powdered sulfonated EPDM terpolymer was mixed by hand with the yellow powder and the mixture was agitated on a rotating mill until a homogeneous mixture had been realized. The resultant blend powder was compression molded at 350° F. (3 minutes preheat, 4 minutes at 20 ton/sq. in. pressure) and cooled under pressure. The resultant pad was flexible, non tacky, and elastomeric.

The following rheological data obtained in a capillary rheometer at 200° F.

| Shear Rate $sec^{-1}$ | Apparent Viscosity Poise |
|---|---|
| 0.88 | 362,800 |
| 29.0 | 36,900 |
| 147.0 | 12,300 |
| 1470.0 | 2,400 |

The extruded strands from the rheometer were tough and elastomeric. This example demonstrates that the dry blended material can be fused, and extruded under conditions of varying shear.

EXAMPLE 4

A dry blend of neutralized sulfonated EPDM is prepared as described below. A free flowing powder capable of passing a 12 mesh screen is prepared via granulation of a coarse crumb of Sulfo EPDM in a suitable granulator. The Sulfo EPDM is prepared as described in Example 1. The resulting coarse powder is approximately ½ to 1 mm in diameter and showed no tendency to agglomerate. Using a suitable high intensity mixer (a Prodex Henschel or Welex Papermixer of the appropriate size which are commercially available mixers) the following ingredients are charged to the vessel:

100 parts of plasticized neutralized sulfonated EPDM described in Example 1.
40 parts of calcium carbonate filler (Purecal U).
25 parts of zinc oxide.

The filler package and Sulfo EPDM gum are mixed for 3–5 minutes at a temperature up to 50° C. The material remains well dispersed. At this point 40 parts of rubber process oil (Sunpar 2280) is added to the mixture over a period of 2 minutes. The mixing is continued for about 5 more minutes and the free flowing dry blend is discharged. The temperature is maintained so that it does not go above about 80° C. The powder can now be stored without agglomeration or can be injection molded directly into a strong rubbery article.

Since many modifications and variations of this invention may be made without departing from the spirit or scope of this invention thereof, it is not intended to limit the spirit or scope thereof to the specific examples thereof.

What is claimed is:

1. An elastomeric composition comprising a free flowing, finely divided powder of a neutralized, sulfonated EPDM terpolymer, said EPDM terpolymer having a number average molecular weight of about 10,000 to about 200,000; an ethylene content of about 40 to less than 70 wt. %; a sulfonate content of about 10 to about 50 meq. neutralized sulfonate groups per 100 grams of said terpolymer, said neutralized sulfonate groups having a metal counterion selected from the group consisting of antimony, iron, lead and Groups 1-A, 11-A, 1-B, and II-B of the Periodic Table of Elements and mixtures thereof, wherein said free flowing, finely divided powder of said neutralized sulfonated EPDM terpolymer has an average particle diameter ranging from about 0.1 mm to about 4 mm, said powder not agglomerating at ambient temperatures under pressure into a fused mass.

2. The composition according to claim 1, further including a preferential plasticizer at a concentration level of about 5 to about 50 parts by weight per hundred based on 100 parts of said neutralized, sulfonated elastomeric polymer.

3. The composition according to claim 1, wherein said neutralized sulfonated elastomeric polymer has a viscosity at 200° C. at 0.73 $sec^{-1}$ of about $5 \times 10^4$ to about $1 \times 10^7$ poises.

4. The composition according to claim 2, wherein said preferential plasticizer has a melting point of at least 25° C. and is selected from the group consisting of carboxylic acids, and metallic salts of said carboxylic acids, and mixtures thereof.

5. The composition according to claim 1, wherein said EPDM terpolymer has less than 60 wt. % ethylene.

6. The composition according to claim 2, wherein said preferential plasticizer is zinc stearate.

7. The composition according to claim 1, further including at least one additive blended with said finely divided powder thereby forming a homogeneous mixture.

8. The composition according to claim 7, wherein said additive is selected from the group consisting of fillers, non-polar backbone process oils, polyolefinics, thermoplastics, and lubricants and mixtures thereof.

9. The composition according to claim 8, wherein said chemical additive or mixtures thereof are incorporated at a concentration level of less than about 500 parts per hundred.

10. The composition according to claim 8, wherein said polyolefinic thermoplastic is selected from the group consisting of polyethylene having a melt index of about at least 6 and polypropylene having a melt flow of about at least 10.

11. The composition according to claim 8, wherein said non-polar backbone process oil is selected from the group consisting of paraffinic, naphthenic and aromatics.

12. The composition according to claim 8, wherein said non-polar backbone process oil is paraffinic having an Mn of at least about 300.

13. The composition according to claim 8, wherein said lubricant is a crystalline hydrocarbon wax having a melting point of about 135° F. to about 220° F. and an Mn of about 1000 to about 4000.

14. The composition according to claim 8, wherein said filler having a particle size of about 0.03 to about 15 microns is selected from the group consisting of carbon black aluminum silicate, talc, calcium silicate, calcium carbonate, and magnesium silicate and mixtures thereof.

15. The composition according to claim 8, wherein said mixture further includes a metallic hydroxide at a concentration level of about less than about 2 parts per hundred, a metal ion of said metallic hydroxide being selected from the group consisting of calcium, magnesium and barium.

16. A process for preparing an elastomeric powder composition which comprises the step of forming a free flowing finely divided neutralized sulfonated EPDM terpolymer, by cryogenic grinding said EPDM terpolymer having a number average molecular weight of about 10,000 to about 200,000 an ethylene content of about 40 to less than 70 wt. %, a sulfonate content of about 10 to about 60 meq. neutralized sulfonate groups per 100 grams of said terpolymer, said neutralized sulfonate groups having a metal counterion selected from the group consisting of antimony, iron, lead, and Groups 1-A, 11-A, 1-B, and II-B of the Periodic Table of Elements and mixtures thereof, wherein said free flowing, finely divided powder has an average particle diameter ranging from about 0.1 mm to about 4 mm.

17. A process according to claim 16, further including:
(a) blending at least one additive with said powder to form a homogeneous mixture, said mixture having less than about 500 parts per hundred by weight of said additive per hundred parts of said powder; and
(b) forming said mixture into an elastomeric article.

18. A process according to claim 17, wherein said blending is done by a high speed mixing process.

19. A process according to claim 17, wherein said blending is done by a drum tumbling process.

20. A process according to claim 17, wherein said forming is done by a rotational casting process.

21. A process according to claim 17, wherein said forming is done by a coating process onto a substrate.

22. A process according to claim 17, wherein said forming is done by an injection molding process.

23. A process according to claim 17, wherein said forming is done by compression molding process.

24. A process according to claim 17, wherein said forming is done by an extrusion process.

25. A process according to claim 17, wherein said chemical additive is selected from the group consisting of polyolefinic thermoplastics, non-polar backbone process oils, fillers, lubricants, and a metallic oxide and mixtures thereof.

26. A process according to claim 22, wherein said non-polar backbone process oil is paraffinic having an Mn of at least about 300.

27. A process according to claim 22, wherein said metal oxide is zinc oxide.

28. A process of claim 22, wherein said lubricant is a crystalline hydrocarbon wax having a melting point of about 135° F. to about 220° F. and an Mn of about 1000 to about 4000.

29. A process according to claim 22, wherein said filler having a particle size of about 0.03 to about 15 microns is selected from the group consisting of carbon black, aluminum silicate, talc, calcium silicate calcium carbonate and magnesium silicate and mixtures thereof.

30. A process according to claim 22, wherein said mixture further includes a metallic hydroxide at a concentration level of about less than about 2 parts per hundred, a metal ion of said metallic hydroxide being selected from the group consisting essentially of calcium, magnesium and barium.

31. A process according to claim 22, wherein said chemical additive or mixtures thereof are at a concentration level of less than about 500 parts per hundred.

32. A process according to claim 22, wherein said polyolefinic thermoplastic is selected from the group consisting of polyethylene having a melt index of about at least 6 and polypropylene having a melt flow of about at least 10.

33. A process according to claim 22, wherein said non-polar backbone process oil is selected from the group consisting of paraffinic, naphthenic and aromatics.

* * * * *